(No Model.)
F. D. CABLE.
ATTACHING SPROCKET WHEELS TO CRANK SHAFTS OF BICYCLES.
No. 496,681. Patented May 2, 1893.
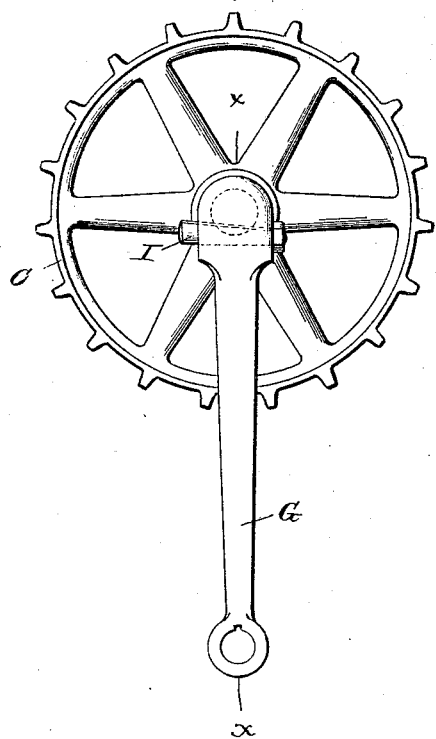
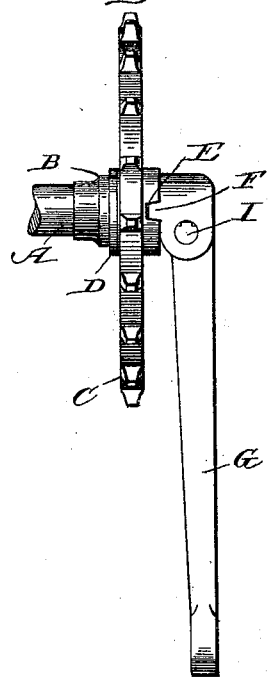
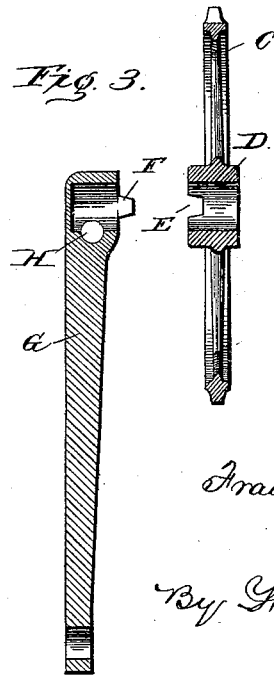
Witnesses
Edwin L. Bradford
Curtis Lammond
Frank D. Cable
Inventor
By Wm C. W. Intire
his Attorney

UNITED STATES PATENT OFFICE.

FRANK D. CABLE, OF TOLEDO, OHIO, ASSIGNOR TO THE YOST MANUFACTURING COMPANY, OF SAME PLACE.

ATTACHING SPROCKET-WHEELS TO CRANK-SHAFTS OF BICYCLES.

SPECIFICATION forming part of Letters Patent No. 496,681, dated May 2, 1893.

Application filed January 5, 1893. Serial No. 457,369. (No model.)

*To all whom it may concern:*

Be it known that I, FRANK D. CABLE, a citizen of the United States, residing at Toledo, in the county of Lucas and State of Ohio, have invented certain new and useful Improvements in Attaching Sprocket-Wheels to Crank-Shafts of Bicycles; and I do hereby declare the following to be a full, clear, and exact description of the invention, such as will enable others skilled in the art to which it appertains to make and use the same.

My invention relates to certain new and useful improvements in the means of securing sprocket wheels to the crank shafts of bicycles.

It has for its objects to facilitate the ready removal and replacement of the sprocket wheels so that one may be substituted for another for the purpose of repairing, or substituting a larger for a smaller one to gain power or speed, as may be required. And with these ends in view my invention consists in providing the crank axle with a collar or shoulder to form an abutment for the inside face of the sprocket wheel hub, which fits loosely on the axle, and forming the face of the hub with a slot or recess adapted to receive a correspondingly shaped tooth or extension formed on the crank, and keying the latter to the axle, so that the crank and sprocket wheel shall become integral, fixed to and move with the axle, all as will be hereinafter more fully explained.

In order that those skilled in the art may fully understand my invention I will proceed to describe the details of construction and arrangement, referring by letters to the accompanying drawings in which—

Figure 1 is a side elevation of a crank, crank shaft and sprocket wheel embodying the features of my invention. Fig. 2 is a front elevation taken at right angles to Fig. 1; and Fig. 3 is a vertical section taken at the line *x*, *x* Fig. 1, with crank axle omitted.

Similar letters denote like parts in the several figures of the drawings.

A represents the crank axle which is turned down at the outer end to form a shoulder or collar B, or said collar may be made separately and secured in any desirable manner to the axle.

C is the sprocket wheel which fits loosely on the axle A with the inside face of the hub D abutting against the shoulder or collar B, as clearly shown at Fig. 2. The outer face of the hub D is formed with a recess or depression E (see Fig. 3) the sides of which are preferably tapering, and adapted to receive a correspondingly shaped tooth or spur F formed on the hub of the crank G, which is also formed with a key-slot H for the reception of a key I, by means of which and a channel within the circumference of the axle A the crank is securely fixed to the axle, and when so fixed to the axle, it will be observed that the hub of the crank and the hub of the crank axle are interlocked by the tooth and slot F, E, whereby the axle, sprocket wheel and crank are all securely connected.

Ordinarily great difficulty occurs, and the use of tools is necessary to remove a damaged sprocket wheel to replace it by a new one, and the same difficulties and necessities arise when it is desired to remove a sprocket wheel for the purpose of substituting for it one of greater diameter to secure increased speed or power. But by means of the construction and arrangement forming the subject of my invention, it is only necessary to withdraw the key I, whereupon the crank and sprocket wheel may both be readily removed from the axle, and a new sprocket wheel being placed upon the axle and the crank put in place and keyed, the change is expeditiously made.

A series of sprocket wheels may be furnished with each bicycle, and the hubs of all being provided with the slot E, and bored to fit the axle, any amateur can readily make the changes necessary.

It will of course be understood that my invention can be utilized in any machine where a crank, crank axle and sprocket wheel are employed.

I do not wish to be confined to the exact details of construction shown as they may be varied to a considerable extent without departing from the spirit of my invention, the gist of which consists in loosely fitting the sprocket wheel to the axle, and interlocking the hub of the sprocket wheel with the crank, and removably securing the latter to the axle.

What I claim as new, and desire to secure by Letters Patent, is—

The combination of an axle provided with a suitable key-slot, a sprocket-wheel having a hub provided with a recess E, a crank G formed with a tooth or spur F, and a locking device I, substantially as and for the purposes set forth.

In testimony whereof I affix my signature in presence of two witnesses.

FRANK D. CABLE.

Witnesses:
W. J. STRONG,
JOHN RIDLEY.